(12) United States Patent
Boone

(10) Patent No.: US 8,386,059 B2
(45) Date of Patent: Feb. 26, 2013

(54) WELL PROG EXECUTION FACILITATION SYSTEM AND METHOD

(75) Inventor: Scott G. Boone, Houston, TX (US)

(73) Assignee: Canrig Drilling Technology Ltd., Magnolia, TX (US)

( * ) Notice: Subject to any disclaimer, the term of this patent is extended or adjusted under 35 U.S.C. 154(b) by 140 days.

(21) Appl. No.: 12/976,736

(22) Filed: Dec. 22, 2010

(65) Prior Publication Data

US 2011/0144809 A1    Jun. 16, 2011

Related U.S. Application Data

(63) Continuation of application No. 11/747,110, filed on May 10, 2007, now Pat. No. 7,860,593.

(51) Int. Cl.
| | |
|---|---|
| G05B 11/01 | (2006.01) |
| G05B 19/18 | (2006.01) |
| G05B 15/00 | (2006.01) |
| G05B 19/42 | (2006.01) |
| E21B 47/00 | (2012.01) |
| E21B 43/12 | (2006.01) |
| G01V 1/40 | (2006.01) |
| G01V 3/18 | (2006.01) |
| G01V 5/04 | (2006.01) |

(52) U.S. Cl. ............... 700/65; 700/17; 700/19; 700/20; 700/83; 700/86; 166/250.01; 166/250.15; 702/6; 702/9

(58) Field of Classification Search .............. 700/17, 700/19–20, 65, 83, 86; 166/250.01, 250.15; 702/6, 9
See application file for complete search history.

(56) References Cited

U.S. PATENT DOCUMENTS

| | | | |
|---|---|---|---|
| 4,794,534 A * | 12/1988 | Millheim | 702/9 |
| 4,839,853 A | 6/1989 | Deerwester et al. | |
| 5,237,539 A * | 8/1993 | Selman | 367/69 |
| 5,301,109 A | 4/1994 | Landauer et al. | |
| 5,603,306 A * | 2/1997 | Tai | 123/633 |
| 5,842,149 A * | 11/1998 | Harrell et al. | 702/9 |
| 6,377,189 B1 * | 4/2002 | Newman | 340/854.6 |
| 6,480,118 B1 | 11/2002 | Rao | |
| 6,519,568 B1 * | 2/2003 | Harvey et al. | 705/1.1 |
| 6,542,827 B1 * | 4/2003 | Koster | 702/22 |
| 6,579,568 B2 * | 6/2003 | Fujiwara et al. | 427/383.7 |
| 6,662,110 B1 * | 12/2003 | Bargach et al. | 702/6 |
| 6,728,638 B2 * | 4/2004 | Newman | 702/5 |
| 6,826,492 B2 * | 11/2004 | Newman | 702/45 |
| 6,892,812 B2 * | 5/2005 | Niedermayr et al. | 166/250.15 |

(Continued)

FOREIGN PATENT DOCUMENTS

WO    WO 2008/140939 A1    11/2008

OTHER PUBLICATIONS

U.S. Appl. No. 10/337,426, Jan. 7, 2003, Bradford.

*Primary Examiner* — Ronald Hartman, Jr.
(74) *Attorney, Agent, or Firm* — Haynes and Boone, LLP

(57) ABSTRACT

A prog analysis and execution system and method. The system includes a computer control system, an interface engine in communication with the computer control system, the interface engine being configured to receive prog information, and an action item development engine in communication with the control system, the action item development engine being configured to analyze received prog information and to determine corresponding action items. The system further includes a sensor engine in communication with the computer control system, the sensor engine being configured to receive input from at least one sensor for use in controlling a well drilling operation, and an operational equipment engine in communication with the computer control system, the operational equipment engine being configured to receive input from the computer control system and to control the well drilling operation in accordance with the determined action items in the prog.

22 Claims, 3 Drawing Sheets

U.S. PATENT DOCUMENTS

| | | | | |
|---|---|---|---|---|
| 6,980,929 | B2 * | 12/2005 | Aronstam et al. | 702/188 |
| 6,980,940 | B1 | 12/2005 | Gurpinar et al. | |
| 7,003,439 | B2 | 2/2006 | Aldred et al. | |
| 7,006,009 | B2 * | 2/2006 | Newman | 340/854.5 |
| 7,006,920 | B2 * | 2/2006 | Newman et al. | 702/6 |
| 7,020,597 | B2 | 3/2006 | Oliver et al. | |
| 7,064,667 | B2 * | 6/2006 | Sosna | 340/568.7 |
| 7,571,054 | B2 * | 8/2009 | Newman | 702/6 |
| 7,739,050 | B2 * | 6/2010 | Tatro | 702/6 |
| 7,779,933 | B2 * | 8/2010 | Sihler et al. | 175/61 |
| 7,945,488 | B2 * | 5/2011 | Karr et al. | 705/28 |
| 2002/0026456 | A1 | 2/2002 | Bradford | |
| 2002/0049575 | A1 * | 4/2002 | Jalali et al. | 703/10 |
| 2003/0074139 | A1 * | 4/2003 | Poedjono | 702/16 |
| 2003/0139916 | A1 * | 7/2003 | Choe et al. | 703/10 |
| 2003/0196798 | A1 * | 10/2003 | Newman | 166/250.01 |
| 2005/0149307 | A1 | 7/2005 | Gurpinar et al. | |
| 2005/0209866 | A1 | 9/2005 | Veeningen et al. | |
| 2006/0181742 | A1 | 8/2006 | Lech et al. | |
| 2006/0185899 | A1 | 8/2006 | Alft et al. | |
| 2008/0065362 | A1 | 3/2008 | Lee et al. | |
| 2008/0179094 | A1 | 7/2008 | Repin et al. | |
| 2008/0181230 | A1 * | 7/2008 | Hitt et al. | 370/395.1 |
| 2008/0275594 | A1 | 11/2008 | de Guzman | |
| 2008/0281525 | A1 | 11/2008 | Boone | |
| 2009/0058674 | A1 * | 3/2009 | Papouras et al. | 340/853.2 |
| 2009/0090555 | A1 | 4/2009 | Boone | |
| 2010/0147510 | A1 * | 6/2010 | Kwok et al. | 166/250.01 |
| 2010/0155142 | A1 * | 6/2010 | Thambynayagam et al. | 175/61 |
| 2010/0250139 | A1 * | 9/2010 | Hobbs et al. | 702/6 |
| 2011/0166789 | A1 * | 7/2011 | Barrow et al. | 702/6 |

* cited by examiner

WELL PROG EXECUTION FACILITATION SYSTEM AND METHOD

CROSS-REFERENCE TO RELATED APPLICATIONS

This is a continuation of U.S. application Ser. No. 11/747,110 (U.S. Patent Publication No. 2008-0281525 A1), filed May 10, 2007, now U.S. Pat. No. 7,860,593 the contents of which is hereby incorporated herein in its entirety by express reference thereto.

BACKGROUND

A well prognosis (prog) is generally understood in the drilling industry to be a detailed and lengthy document containing specifications, goals, plans, etc. for drilling and completing a well, and most drilling companies have a preferred format and structure for their progs. However, there is no universal standardization for progs, and therefore each company's format and structure is generally distinct. However, despite the distinctive structure and format of progs, there are certain types of information, generally referred to herein as critical information, that are generally included in every prog. Critical information may be distinguishable or identified by particular elements in the prog, such as words, characters, symbols, or phrases that are generally associated with the particular critical information. These identifying elements generally indicate to one skilled in the drilling art that a particular event, activity, routine, occurrence, or other happening, within the drilling operation is being addressed in the prog. The information contained in the prog adjacent to these identifying elements is likely to pertain to the corresponding event indicated by the identifying elements (simply by proximity). These corresponding events may be action items that require some action to be taken to ensure that the event is performed according to the prog.

An example of an event for which information is typically included in a drilling operation prog may include a general description of the well to be drilled. This general description may be considered to be an objective of the prog. In a drilling operation, other activities generally detailed in a prog may include operational instructions based on well depth, spud details, such as the drive pipe depth, cementing details, filing of governmental forms, running surface pipe, when to order more pipe or cement, testing the shoe, intermediate casing completion, liner run, reaching total depth, logs to run, notifications to make, well log samples to deliver, information of interest about the formation, including depths for expected overpressure and depletion, disaster plans, logging run notifications, sample distributions lists, joint service agreements ("JSA's") for specific tasks, other well control procedures, directional programs, expected days versus depth data, etc.

It would be a valuable addition to the field to provide an automated system having a computer system and an action item development engine, where the system would assist an operator to compile and assess a detailed well prog in order to identify potential action items, define actions to be taken upon encountering the identified action item, and document the defined actions in order to trigger automated alerts and reminders to take the actions when a particular action item is encountered. Such a system would enable methods of compiling, assessing, and documenting detailed project plans, including assessing a project plan for potential action items, defining and documenting actions to be taken upon encountering actual action items, and executing the project plan, providing alerts and reminders of actions to be taken when particular action items are encountered. The response to the alerts and the actions taken as the result of process could then be recorded versus the timeline or schedule of the program to close the loop on the collaboration process.

SUMMARY OF THE DISCLOSURE

Elements included in this disclosure, and their relationships, may be viewed in a variety of ways. As such, the subject matter of the current disclosure may be described as a project plan execution system, wherein a computer system may be operably coupled with an interface engine, an action item development engine, and a sensor engine, and the computer system is capable of receiving and storing a project execution prog and communicating with each of the engines to analyze a prog and control a well drilling operation in accordance with the specifications set forth in the prog.

The present disclosure provides a prog analysis and execution system. The system includes a computer control system, an interface engine in communication with the computer control system, the interface engine being configured to receive prog information, and an action item development engine in communication with the control system, the action item development engine being configured to analyze received prog information and to determine corresponding action items. The system further includes a sensor engine in communication with the computer control system, the sensor engine being configured to receive input from at least one sensor for use in controlling a well drilling operation, and an operational equipment engine in communication with the computer control system, the operational equipment engine being configured to receive input from the computer control system and to control the well drilling operation in accordance with the determined action items in the prog.

The present disclosure also provides a computer program embodied on a computer readable medium, wherein the computer program is configured to control a method for analyzing a prog. The method includes receiving a prog in an interface module, analyzing the prog and determining action items corresponding to identified events in the prog in an action item development module, and controlling a well drilling operation in accordance with the determined action items from the prog with an sensor module and an operational equipment control module.

The present disclosure also provides a method for controlling a well drilling operation. The method includes receiving a well prog, converting the well prog into a computer readable format, scanning the converted well prog to identify action items, associating a response with each identified action item, and controlling a well drilling operation in accordance with the responses associated with each identified action item from the well prog.

DETAILED DESCRIPTION

Figure 1:
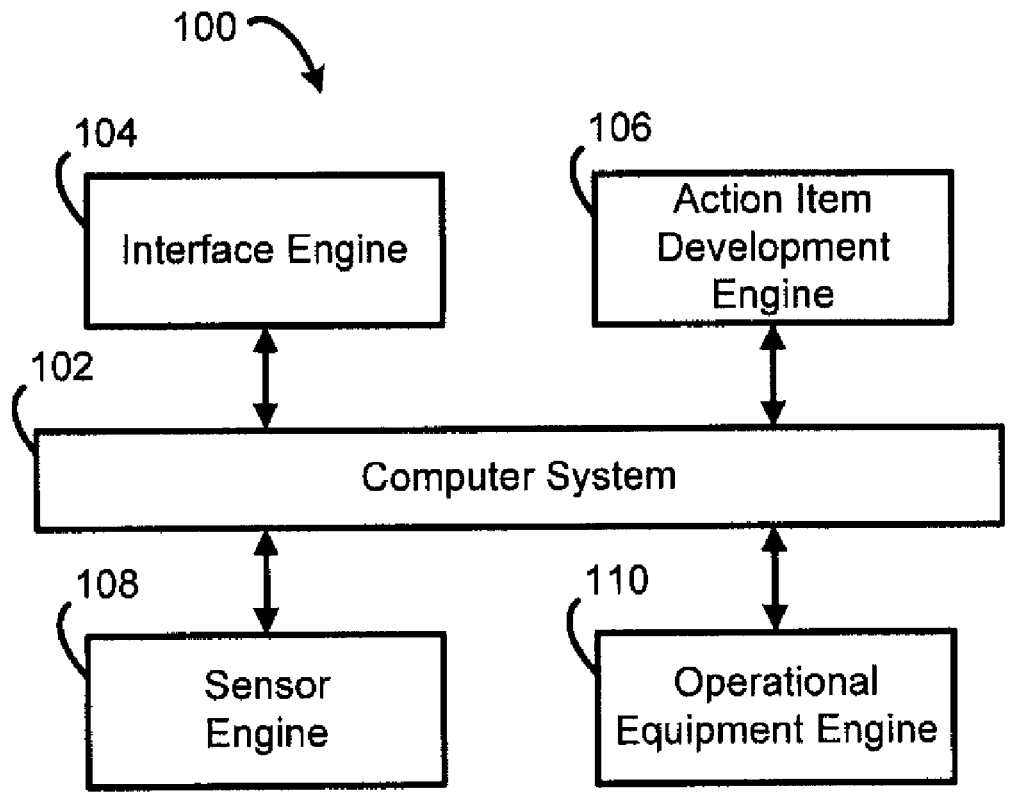
FIG. 1 illustrates an exemplary schematic diagram of a prog facilitation system according to one or more aspects of the present disclosure.

Applicant notes that the following description references exemplary embodiments. The present disclosure, however, is not limited to any specifically described embodiment; rather, any combination of the following features and elements, whether related to a described exemplary embodiment or not, may be used, implemented and/or practiced within the scope of the present disclosure. Moreover, in various exemplary embodiments, the present disclosure may provide advantages over the prior art; however, although the exemplary embodiments of the present disclosure may achieve advantages over other possible solutions and the prior art, whether a particular advantage is achieved by a given embodiment is not intended in any way to limit the scope of the present disclosure. Thus, the following aspects, features, embodiments and advantages are intended to be merely illustrative of the present disclosure and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

Further, at least one embodiment of the present disclosure is implemented as a program product for use with a computer system. The program product defines functions of the embodiments (including the methods) described herein and can be contained on a variety of computer readable media. Illustrative computer readable media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive, writable CD-ROM disks and DVD disks, zip disks, and portable memory devices); and (iii) information conveyed across communications media, (e.g., a computer, telephone, wired network, or wireless network). These embodiments can include information shared over the Internet or other computer networks. Such computer readable media, when carrying computer-readable instructions that perform methods of the invention, represent an exemplary embodiment of the invention.

Further still, in general, software routines implementing embodiments of the present disclosure may be part of an operating system or part of a specific application, component, program, module, object, or sequence of instructions, such as an executable script. Such software routines typically include a plurality of instructions capable of being performed using a computer system or other type or processor configured to execute instructions read from a computer readable medium. Also, programs typically include or interface with variables, data structures, etc. that reside in a memory or on storage devices as part of their operation. In addition, various programs described herein may be identified based upon the application for which they are implemented. Those skilled in the art will readily recognize, however, that any particular nomenclature or specific application that follows facilitates a description of the invention and does not limit the invention for use solely with a specific application or nomenclature. Furthermore, the functionality of programs described herein may use a combination of discrete modules or components interacting with one another. Those skilled in the art will recognize, however, that different embodiments may combine or merge such components and modules in a variety of ways.

Additionally, this disclosure refers to "engines," which are generally understood in the context of a system to mean an agent, instrument, or combination of either, or both, agents and instruments that may be associated to serve a purpose or accomplish a task. Agents and instruments may include sensors, actuators, switches, relays, valves, power plants, system wiring, equipment linkages, specialized operational equipment, computers, components of computers, programmable logic devices, microprocessors, software, software routines, software modules, communication equipment, networks, network services, and other elements and their equivalents which contribute to the purpose or task to be accomplished by the engine.

A well prognosis, or a well program, referred to by people in the drilling industry as a "prog," or "well prog," is generally known to be a detailed document containing the information various experts contribute to plan for and chronicle the steps of drilling a well, which, in general includes all aspects surrounding the creation of an operational well, including planning, drilling, and completing. The prog is used by the operator's company representative, generally known as a Company-man, to ensure best-practices are used at every step and in every aspect of drilling the well.

FIG. 1 illustrates a schematic diagram of an exemplary prog facilitation system 100 according to one or more aspects of the present disclosure. The exemplary prog facilitation system 100 includes a computer system 102 coupled to an interface engine 104, an action item development engine 106, a sensor engine 108, and an operational equipment engine 110. Each of the engines may be software modules or software routines in a computer program embodied on a computer readable medium, for example. Alternatively, some of the engines may be software modules or routines, while others of the engines may be hardware elements in communication with the computer system 102. The computer system 102 operates to control the interaction of data with and between the other components of the system 100.

The interface engine 104 includes at least one input and output device and system that enables a user to interact with the computer system 102 and the functions that the computer system 102 provides. An exemplary interface engine 104 may have multiple user stations, which may include a video display, a keyboard, a pointing device, a document scanning/recognition device, or other device configured to receive an input from an external source, which may be connected to a software process operating as part of a computer or local area network. The exemplary interface engine 104 may include externally positioned equipment configured to input data (such as a well prog) into the computer system 102. Data entry may be accomplished through various forms, including raw data entry, data transfer, or document scanning coupled with a character recognition process, for example.

The interface engine 104 may include a user station that has a display with touch-screen functionality, so that a user may receive information from the system 100, and provide input to the system 100 directly via the display or touch screen. Other examples of sub-components that may be part of an interface engine 104 include, but are not limited to, audible alarms, visual alerts, telecommunications equipment, and computer-related components, peripherals, and systems. Sub-components of the interface engine 104 may be positioned in various locations within an area of operation, such as on a drilling rig at a drill site. Sub-components of the interface engine 104 may also be remotely located away from the general area of operation, for example, at a business office, at a sub-contractor's office, in an operations manager's mobile phone, and in a sub-contractor's communication linked personal data appliance. A wide variety of technologies would be suitable for providing coupling of various sub-components of the interface engine 104 and the interface engine 104 itself to the computer system 102.

Figure 2:
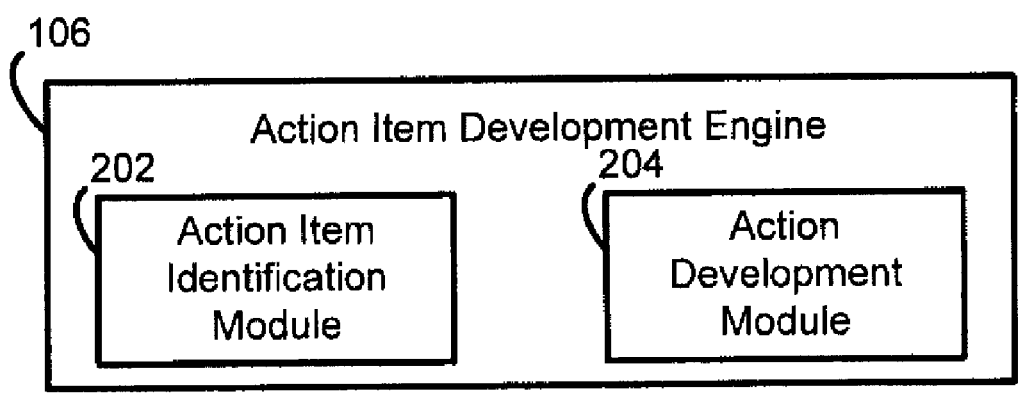
FIG. 2 illustrates an exemplary schematic diagram of the components of an action item development engine according to one or more aspects of the present disclosure.

FIG. 2 illustrates an exemplary schematic diagram of the components of an action item development engine according to one or more aspects of the present disclosure. The action item development engine 106 may include sub-components that may operate to assess or analyze a prog entered into the prog facilitation system 100. The action item development engine 106 may also operate to assist an operator in assessing the prog. The action item identification module 202 generally functions to review the prog according to a predetermined logic program configured to identify events from elements in the prog and determine if the event requires some action on the part of the system or an operator that would make the event an action item. The action item identification module 202 may work either in conjunction with the operator, or independently, to identify potential events and determine if those potential events are action items. Thus, in an exemplary embodiment of the present disclosure, the action item identification module 102 generally operates to scan through a prog to identify relevant events. The relevant events to be identified may be predetermined and may be located in the prog by key word, symbol, phrase, etc. searching. Once a potential event is identified, the action item identification module 202 marks a representative section of data for the potential event, so that the section of data may be readily identified for future consideration. A suitable form of marking may include highlighting a section of text that identifies the potential event or digitally marking an electronic version of the prog.

For each potential event identified, the action item development module 202 then makes a determination of whether the potential event is an action item. The determination of which events constitute action items may be conducted by a software routine configured to analyze the events in accordance with a predetermined algorithm. The software program may be configured to compare identified events or portions of events to a known database of events that are known to constitute action items to determine if the identified event should be an action item in the current prog. For each action item identified, the action development module 204 operates to determine what action to take in response to the occurrence of the identified action item, where the action to be taken may be detailed to include what action to take, who is responsible to take the action, when to take the action, how and to whom to confirm the action is taken, and any other action the operator deems necessary and prudent to have performed at the occurrence of the action item. The detailed actions may be saved as part of the prog (integrally) in a form useable by the prog facilitation system 100 during execution of the prog, so that the prog facilitation system 100 may prompt appropriate parties to take action at the appropriate time, as defined in the prog and action items. Alternatively, a separate report or action item list may be created for use by an operator.

In an exemplary embodiment of the present disclosure, a computer system may perform the task of action item identification module 202, to efficiently identify related information that may be inferred from text. A computer system that may perform the functions of an action item identification module 202 may employ technology referred to as Latent Semantic Indexing ("LSI"). LSI technology is described, for example, in U.S. Pat. No. 4,839,853, issued Jun. 13, 1989, to Deerwester, S, et al., entitled "Computer Information Retrieval Using Latent Semantic Structure." Additionally, a computer system that may perform functions of an action item identification module 202 may employ LSI technology in cross-language applications as described, for example, in U.S. Pat. No. 5,301,109, issued Apr. 5, 1994, to Landauer, T., et al., entitled "Computerized Cross-language Document Retrieval Using Latent Semantic Indexing." Additionally, a exemplary computer system that may perform functions of an action item identification module 202 may employ the LSI technology in text analysis and interpretation as described, for example, in U.S. Patent Application No. 20020026456, filed Aug. 24, 2001, by Bradford, R., entitled "Word Sense Disambiguation," U.S. Patent Application No. 200220103799, filed Aug. 2, 2002, to Bradford, R., et al., entitled "Method for Document Comparison and Selection," and U.S. patent application Ser. No. 10/337,426, filed Jan. 7, 2003, also by Bradford, R., entitled "Vector Space Method for Secure Information Sharing." Each of the above noted references is hereby incorporated by reference into the present application, to the extent that these references are not inconsistent with the present disclosure.

Referring back to FIG. 1, the sensor engine 108 may include devices such as sensors, meters, detectors, or other devices configured to measure or sense a parameter related to a prog specification or a component of a well drilling operation. The sensors or other detection devices are generally configured to sense or detect activity, conditions, and circumstances in an area to which the device has access. Sub-components of the sensor engine 108 may be deployed at any operational area where information on the execution of the prog may occur. Readings from the sensor engine 108 are fed back to the computer system 102. The computer system 102 may send signals to the sensor engine 108 to adjust the calibration or operational parameters in accordance with a control program in the computer system, which is generally based upon the prog. Additionally, the computer system 102 may generate outputs that control the well drilling operation, as discussed below.

The operational equipment engine 110 may include a plurality of devices configured to facilitate accomplishment of the objectives set forth in the prog. In an exemplary embodiment, the objective is to drill a well in accordance with the specifications set forth in the prog. Therefore, the operational equipment engine 110 may include hydraulic rams, rotary drives, valves, and pumps, control systems, and any other tools, machines, equipment, etc. that would be required to drill the well in accordance with the prog. The operational equipment engine 110 may be designed to exchange communication with computer system 102, so as to not only receive instructions, but to provide information on the operation of operational equipment engine 110 apart from any associated sensor engine 108. The operational equipment engine 110 may be configured to receive control inputs from the computer system 102 and to control the well drilling operation (the components conducting the well drilling operation) in accordance with the received inputs from the computer system 102.

Figure 3:
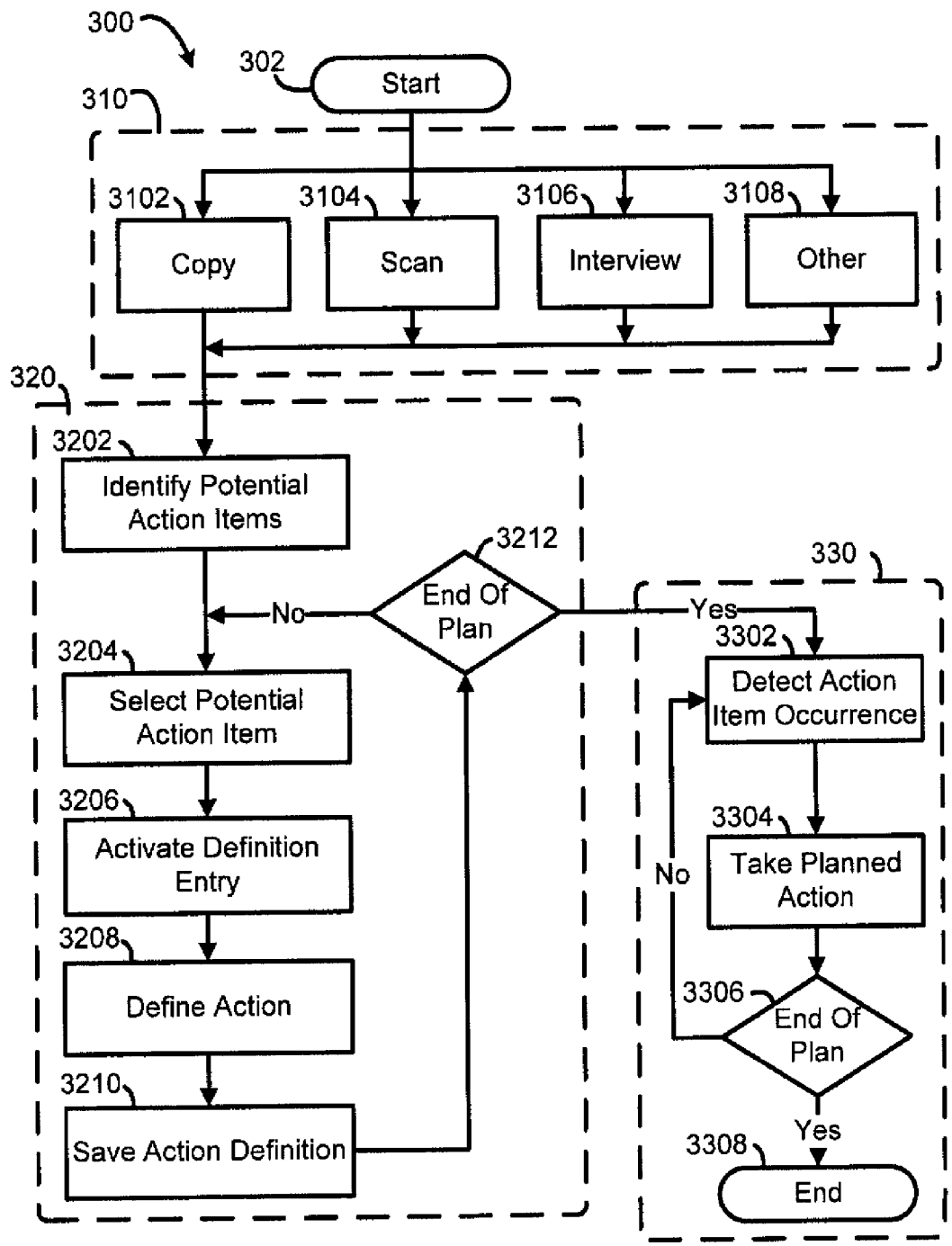
FIG. 3 illustrates an exemplary flow diagram of a process for executing a project using a prog facilitation system according to one or more aspects of the present disclosure.
Figures 4, 5:
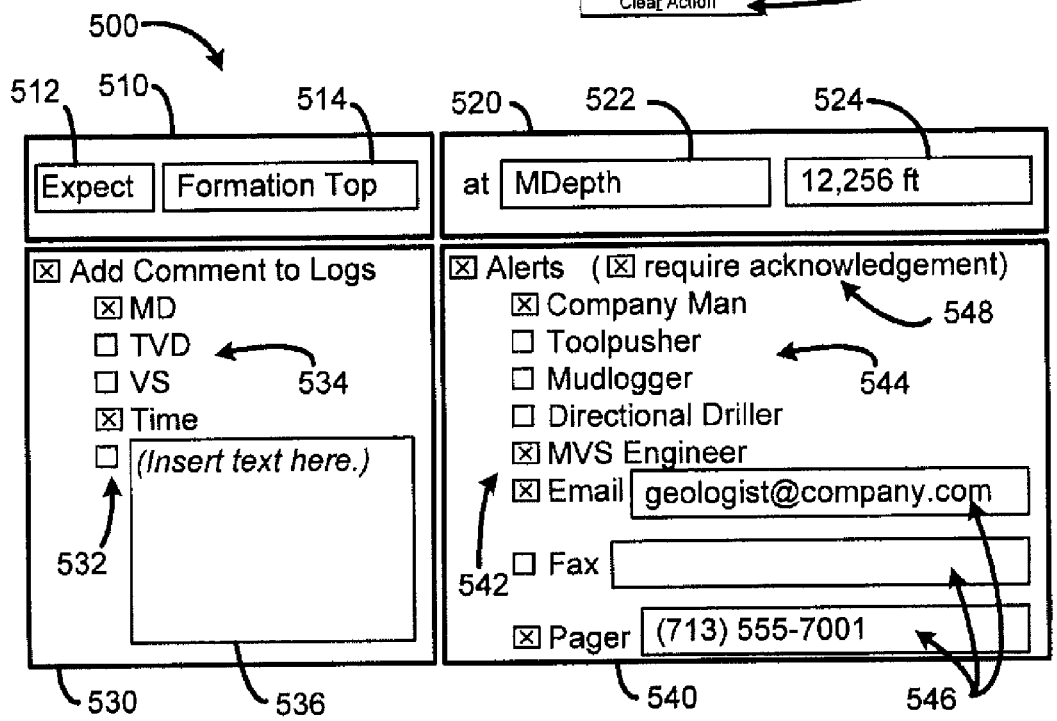
FIG. 4 illustrates an exemplary operational display of an action item identification module according to one or more aspects of the present disclosure.
FIG. 5 is an illustration of an exemplary operational display of an action development module according to one or more aspects of the present disclosure.

Referring now to FIGS. 3-5, the process of an exemplary well prog facilitation process 300 is illustrated. The exemplary well prog drilling facilitation process 300 begins at 302. An exemplary project execution prog is entered into a computer system 102, at 310, through interface engine 104. Interface engine 104 may include equipment and systems that support a variety of prog data entry methods. Entering the project execution prog may be accomplished by a selected manner or combination of manners, which include copying a text data file into the computer system, at 3102, scanning a document into the computer system and conducting a character recognition process on the document at 3104, responding to an interview that asks pertinent questions about the full range of potential operations the prog may cover (initiated by the facilitation module) at 3106, or incorporating the prog or elements of the prog into the computer system 102 by any other method of transferring text from a hard copy document into a machine readable format at 3108.

Typical activities that will be described in a project execution prog include any activity understood to one skilled in the art to relate to execution of the project (drilling the well). In a drilling operation, such activities may include operational instructions based on well depth, spud details, such as the drive pipe depth, cementing details, and filing of governmental forms, running surface pipe, including order the pipe, ordering the cement, and testing the shoe, intermediate casing completion, liner run, reaching total depth, including logs to run, notifications to make, well log samples to deliver, information of interest about the formation, including depths for expected overpressure and depletion, disaster plans, logging run notifications, sample distributions lists, JSA's for specific tasks, other well control procedures, directional programs, and expected days versus depth data. An exemplary prog excerpt 400 is shown in FIG. 4, which illustrates the plurality of details and specifications that may be contained in a prog.

Once the exemplary project execution prog is entered into a computer system 102, at 310, the exemplary facilitation module 300 initiates a process of scanning or assessing the prog for events and action items at 320. In the exemplary facilitation process 300, potential events that may occur during execution of the prog are identified and assessed by the action item development engine 106 to determine if the operator needs any action to be conducted in response to the event in the prog. An operator, through the computer system 102 and the interface engine 104, may indicate that an action is to be taken (or omitted) in accordance with the information presented in the prog, interactively and through defined instructions, whether the action item identification module 202 should identify a particular event as an action item, or not.

In one embodiment of the present disclosure, the entire prog is scanned or assessed by the action item identification module 202, to identify potential action items, at 3202, and the action item identification module 202 marks a representative section of data in the prog for each identified action item, so that each action item may be readily identified for future consideration. A suitable form of marking may include highlighting a section of text that identifies the action item, or electronically marking a section of the prog in the situation where the prog has been converted to an electronic format for assessment. Potential action items 410 are shown as shaded areas in FIG. 4.

Once the action item identification module 202 identifies the action items if the prog in 3202, the action development module 204 may use instructions from an operator to define actions that should be taken upon the occurrence of each particular action item. Alternatively, the action development module 204 may be configured to determine appropriate actions in response to action items without external interaction. For example, the action development module 204 may include a software routine configured to identify particular action items and associate the identified action items with a particular predefined action to be taken in response to the action item. The action development module 204 is configured to locate and select a potential action item, at 3204. In the exemplary embodiment, a potential action item is located by the operator noticing the potential action item is marked, and then selecting the marked potential action item with the cursor 420 of the interface engine 104. In the exemplary embodiment, right-clicking on the potential action item 410 activates definition entry, at 3206, causing a menu 430 to appear. As noted above, in an alternative to having an operator select actions in response to identified action items, the action development module 204 may be configured to autonomously determine the appropriate actions in response to the identified actions items in at least one embodiment of the present disclosure. This autonomous determination may be driven by a software routine configured to compare identified action items to a database of known actions in response to action items.

The menu 430 may offer standard word processing action choices 432, as well as a define action choice 434, and a clear action choice 436. In 3208, the define action choice 434 is selected, which opens action definition window 500, which permits documentation of various actions the operator wants taken upon the occurrence of the particular action item. The exemplary action definition window 500 has an action item box 510, an occurrence window 520, an action documentation window, and an alert distribution window 540. Action item box 510 may have an instruction box 512 and an item box 514. The exemplary instruction box 512 accepts an entry of an instruction for someone to carry-out, such as expect, set, run, and alert. The exemplary item box 514 accepts an entry of the item to which the instruction in instruction box 512 relates. Examples of entries that may be made in the item box 514 include formation top, pipe, logs, and personnel.

Occurrence window 520 may have a parameter box 522 and a specification box 524. The exemplary parameter box 522 accepts an entry of a physical parameter that my be encountered or achieved during the operation, such as a measured depth ("MD"), a true vertical depth ("TVD"), and a vertical section ("VS"). The exemplary specification box 524 may accept an entry of quantifiable values of the entry in the parameter box 522, which may be used to know that physical parameter should be encountered when the specified quantifiable value is attained. Examples of quantifiable values include a depth measurement, typically in feet, a date, and a time, and may be entered in the specification box 524 singularly or in combinations.

Action documentation window 530 may have a set of selection boxes 532, with corresponding potential entries 534, as well as a comment box 536. Selection boxes 532 may be clicked to change the selection box 532 to contain a mark, in order to indicate the selection box 532 is selected. In an exemplary embodiment, a selection box 532 may correspond to a choice to add comments to a log upon the occurrence of the particular action item. Other selection boxes 532 may indicate what potential entries the operator of the facilitation module 300 wants entered into the log. An additional select box permits the operator of the facilitation module 300 to choose a text entry, entered in the comment box 536, is to be entered into the log upon the occurrence of the particular action item.

An alert distribution window 540 may have a set of selection boxes 543, with corresponding potential recipients 544, as well as custom contact input boxes 546, and a response instruction box 548. Selection boxes 542 may be clicked to change the selection box 542 to contain a mark, in order to indicate the selection box 542 is selected. In the exemplary embodiment, a selection box 542 corresponds to a choice to provide alerts upon the occurrence of the particular action item. Other selection boxes 542 indicate the designation of the corresponding recipient 544 to receive the alert upon the occurrence of the particular action item. Custom contact input boxes 546 permits the operator of the facilitation module 300 to identify, and provide appropriate contact information, for other recipients not anticipated in the list of recipients 544. Exemplary entries in to custom contact input boxes 546 include email addresses, fax numbers, and pager numbers. A custom contact input box 546 may accept information to reach multiple recipients, such as a string of delineated email addresses, a designation of an email mailing list, or a fax or pager distribution list. Response instruction 548 permits the operator of the facilitation module 300 to require recipients acknowledge receipt of the alert. This may be accomplished by varied methods, depending on the manner in which the alert is distributed. Protocols may be established and disseminated to users that define what makes for an appropriate response to a response instruction 548 that requires an acknowledgement. Additionally, a response instruction 548, and corresponding selection box 542, may be associated with each recipient 544, such that selected recipients 544 may be required to acknowledge an alert, while other recipients 544 may not be required.

The action definition is then saved, at 3210. The action development module 204 then tests to see if the action development engine 106 has reached the end of the prog, where all the potential action item 410 in the prog have been reviewed, at 3212. If the end of the prog is not reached, the action development module 204 selects another potential action item 410, at 3204. If the end of the prog is reached, at 3212, the exemplary facilitation module 300 is in a state where the action definitions may be employed to execute the prog, at 330.

During execution of the prog, at 330, data from the sensor engine 108 allows the computer system to detect the occurrence of an action item, at 3302. Upon detection of an action item, at 3302, the exemplary facilitation module 300 follows the action definition and takes the planned action, at 3304. After all the planned action for a particular action item is taken the facilitation module 300 tests to see if the end of the prog has been reached, at 3306. If the end of the prog is not reached, the facilitation module 300 continues to monitor the data from the sensor engine 108, waiting for the detection of the next action item occurrence, at 3302. If the end of the prog is reached, at 3306, the facilitation module 300 concludes, at 3308.

In an alternate exemplary embodiment of assessing the prog, at 320, once the action item identification module 202 identifies an action item, the action development module 204 employs instructions from an operator to define actions that should be taken upon the occurrence of that particular action item.

In an additional alternate exemplary embodiment of assessing the prog, at 320, the action item identification module 202 compiles a list of potential action items 410 apart from the text of the prog, at 3202. In this embodiment, the potential action items 410 may appear in a list form, rather than contained in the text of the prog. The potential action items 410 may then be either cleared from the list, as not being actual action items, or they may be defined from the list in a similar fashion as described above, at 3204 through 3212.

Although only a few exemplary embodiments have been described in detail above, those skilled in the art will readily appreciate that many modifications are possible in the exemplary embodiments without materially departing from the novel teachings and advantages of this disclosure. Accordingly, all such adjustments and alternatives are intended to be included within the scope of the present disclosure, as defined exclusively in the following claims. Those skilled in the art should also realize that such modifications and equivalent constructions or methods do not depart from the spirit and scope of the present disclosure, and that they may make various changes, substitutions, and alternations herein without departing from the spirit and scope of the present disclosure. Additionally, the inventors contemplate that any combination of the above noted exemplary embodiments may be used, as the invention is not limited to any particular combination of the above noted exemplary embodiments.

What is claimed is:

1. A transferable well prog system, comprising:
   operational instructions based on a plurality of parameters for at least one well;
   a logging system adapted to receive critical information indicative of a particular first event for the at least one well within a particular geologic region;
   a database of events that constitute action items that require at least one procedure to be taken;
   wherein data regarding the particular first event for the at least one well in the logging system of the well prog system is used to define an action item for a second particular event for at least one other well in the logging system.

2. The transferable well prog system of claim 1, wherein the particular event comprises an activity, a routine, an occurrence, or an action item.

3. The transferable well prog system of claim 1, further comprising one or more notifications that alert or remind a corresponding operator when a particular action needs to be taken during a drilling operation.

4. The transferable well prog system of claim 3, wherein a recipient(s) of each notification is required to respond before the drilling operation proceeds.

5. The transferable well prog system of claim 1, further comprising at least one input source to enter data into the well prog system or components thereof.

6. The transferable well prog system of claim 1, wherein the database of action items is adapted to have additional newly encountered action items added during the drilling process.

7. The transferable well prog system of claim 1, wherein the well prog system is searchable.

8. The transferable well prog system of claim 1, wherein the operator can add comments to the logging system.

9. The transferable well prog system of claim 1, wherein the at least one other well is adjacent to the geologic region.

10. The transferable well prog system of claim 1, wherein the logging system includes information from a sensor engine configured to measure or sense a parameter related to a component of a well drilling operation.

11. A transferable well prog system, comprising:
    operational instructions based on a plurality of parameters for at least one well;
    a logging system adapted to receive critical information indicative of a particular event for the at least one well within a particular geologic region;
    a database of events that constitute action items that require at least one procedure to be taken;
    wherein the well prog system from at least one well drilling operation is transferable to at least one other well,
    wherein the plurality of parameters comprise: well depth, a spud detail, a cementing detail, filing of a governmental form, running surface pipe, ordering pipe, ordering cement, testing a shoe, intermediate casing completion, liner run, reaching total depth, a log to run, a notification to make, a well log sample to deliver, information of interest about the formation, a disaster plan, joint service agreements for specific tasks, a well control procedure, logging run notification, a sample distribution list, a directional program, and expected days versus depth data.

12. A method for controlling a well drilling operation, comprising:
   receiving a well prog;
   assessing the well and adjusting the well prog regarding one or more parameters relative to a previously drilled well;
   assessing the well prog to identify each action item;
   associating a response with each identified action item;
   storing the action items within the well prog;
   controlling a well drilling operation in accordance with the response associated with each identified action item; and
   updating the well prog for drilling a further well by adding to the well prog one or more additional events that arise during the well drilling operation.

13. The method of claim 12, wherein assessing the well prog to identify each action item comprises comparing a plurality of potential action items to a database of action items, and marking the data corresponding to the potential action items for later analysis.

14. The method of claim 12, wherein the one or more parameters relative to a previously drilled well are automatically acted upon when the well prog system is transferred to a well within the same geologic region.

15. The method of claim 12, wherein associating a response with each identified action item comprises matching identified action items with corresponding responses in a database of predetermined responses.

16. The method of claim 12, wherein associating a response with each identified action item comprises the operator selecting the response from a list of possible responses presented to the operator on a screen.

17. The method of claim 12, wherein the further well is within the same geologic region as a prior well that used the same method.

18. The method of claim 17, further comprising storing the physical parameters of the prior well within the well prog system.

19. The method of claim 12, further comprising inputting operational instructions into a well prog system after assessing the well to identify newly encountered physical parameters within the well.

20. The method of claim 19, wherein the operational instructions are automatically calibrated based on physical parameters of the well.

21. The method of claim 12, wherein the well and well prog system are assessed during execution of the well prog.

22. The method of claim 12, wherein assessing the well and adjusting the well prog regarding one or more parameters relative to a previously drilled well comprises using a sensor engine to detect a condition or circumstance within the area of operation of the well.

* * * * *